United States Patent
Piotrowski

(10) Patent No.: US 6,496,217 B1
(45) Date of Patent: Dec. 17, 2002

(54) VIDEO COMMUNICATION SYSTEM USING MODEL-BASED CODING AND PRIORITZATION TECHNIQUES

(75) Inventor: Tony E. Piotrowski, Wayne, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/878,979

(22) Filed: Jun. 12, 2001

(51) Int. Cl.[7] .................................................. H04N 7/14
(52) U.S. Cl. .............................. 348/14.12; 348/14.13; 348/14.08
(58) Field of Search ........................... 348/14.01–14.09, 348/14.11, 14.12, 14.13; 382/103, 236; H04N 7/14, 7/15

(56) References Cited

U.S. PATENT DOCUMENTS 5,710,590 A  *  1/1998  Ichige et al. ............. 348/14.01

FOREIGN PATENT DOCUMENTS

JP        410200519 A   *  7/1998   ............. H04L/9/08
JP        2000350197 A  * 12/2000   ............. H04N/7/24

* cited by examiner

*Primary Examiner*—Melur Ramakrishnaiah

(57) ABSTRACT

A method and communication system are disclosed that use object prioritization and layered image coding in image/video transmission. Objects within an image/video are identified and models are assigned to represent the objects. Priorities are assigned for the objects in accordance with predetermined prioritization rules, then communication channels to communicate data related to the models are assigned so that a higher priority object is assigned to a communication channel having a reliability factor higher than a lower priority object.

20 Claims, 7 Drawing Sheets

MASKED

VIDEO COMMUNICATION SYSTEM USING MODEL-BASED CODING AND PRIORITZATION TECHNIQUES

FIELD OF THE INVENTION

The present invention pertains generally to the field of video communications, and in particular, the invention relates to a system and method for using object prioritization and layered image coding in image/video transmission.

BACKGROUND OF THE INVENTION

Video/image communication applications over very low bitrate channels such as the Internet or the Public Switch Telephone Network (PSTN) are growing in popularity and use. Conventional image communication technology, e.g., JPEG or GIF format, require a large bandwidth because of the size (i.e., amount of data) of the picture. Thus, in the low bitrate channel case, the received resulting image quality is generally not acceptable.

Methods have been used to improve video/image communication and/or to reduce the amount of information required to be transmitted for low bitrate channels. One such method has been used in videophone applications. An image is encoded by three sets of parameters which define its motion, shape and surface color. Since the subject of the visual communication is typically a human, primary focus can be directed to the subject's head or face.

One known method for object (face) segmentation is to create a dataset describing a parameterized face. This dataset defines a three-dimensional description of a face object. The parameterized face is given as an anatomically-based structure by modeling muscle and skin actuators and force-based deformations. In such parameterized face models, a set of polygons may be used to define a human face. Each of the vertices of the polygons are defined by X, Y and Z coordinates. Each vertex is identified by an index number. A particular polygon is defined by a set of indices surrounding the polygon. A code may also be added to the set of indices to define a color for the particular polygon.

Systems and methods are also known that analyze digital images, recognize a human face and extract facial features. Conventional facial feature detection systems use methods such as facial color tone detection, template matching, edge detection approaches or disparity map methods.

In conventional face model-based video communications, a generic face model is typically either transmitted from the sender to the receiver at the beginning of a communication sequence or pre-stored at the receiver side. During the communication, the generic model is adapted to a particular speaker's face. Instead of sending entire images from the sender's side, only parameters that modify the generic face model need to be sent to achieve compression requirements.

Another coding scheme used in image transmission is layered source coding. In this coding scheme, video data information is decomposed into a number of layers, each represents different perceptually relevant components of the video source. The base layer contains the essential information for the source and can be used to generate an output video signal with an acceptable quality. With the enhancement layers, a higher quality video signal can be obtained.

FIG. 2 illustrates a typical video system 10 with layered coding and transport prioritization. A layered source encoder 11 encodes input video data. A plurality of channels 12 carry the encoded data. A layered source decoder 13 decodes the encoded data.

There are different ways of implementing layered coding. For example, in temporal domain layered coding, the base layer contains a bit stream with a lower frame rate and the enhancement layers contain incremental information to obtain an output with higher frame rates. In spatial domain layered coding, the base layer codes the sub-sampled version of the original video sequence and the enhancement layers contain additional information for obtaining higher spatial resolution at the decoder.

Generally, a different layer uses a different data stream and has distinctly different tolerances to channel errors. To combat channel errors, layered coding is usually combined with transport prioritization so that the base layer is delivered with a higher degree of error protection. If the base layer is lost, the data contained in the enhancement layers may be useless.

The inventor has realized that there are benefits in using aspects of model-based coding and layered source coding techniques to improve performance, in particular, using prioritization in object coding for image/video transmission.

BRIEF SUMMARY OF THE INVENTION

It is an object of the present invention to address the limitations of the conventional video/image communication systems and model-based coding discussed above.

One aspect of the present invention is directed to prioritizing object identified in an image.

An other aspect of the present invention is directed to masking certain objects based upon the assigned priority and encoding the unmasked objects separately from the masked objects.

One embodiment of the invention relates to a method for a method for coding data in an image/video communication system including the steps of identifying at least two objects with in an image, assigning models to represent the objects and prioritizing the objects in accordance with predetermined prioritization rules. Communication channels are assigned to communicate data related to the models for the two objects so that a higher priority object is assigned to a communication channel having a reliability factor higher than a lower priority object.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DESCRIPTION OF THE PREFERRED EMBODIMENTS

Figure 1:
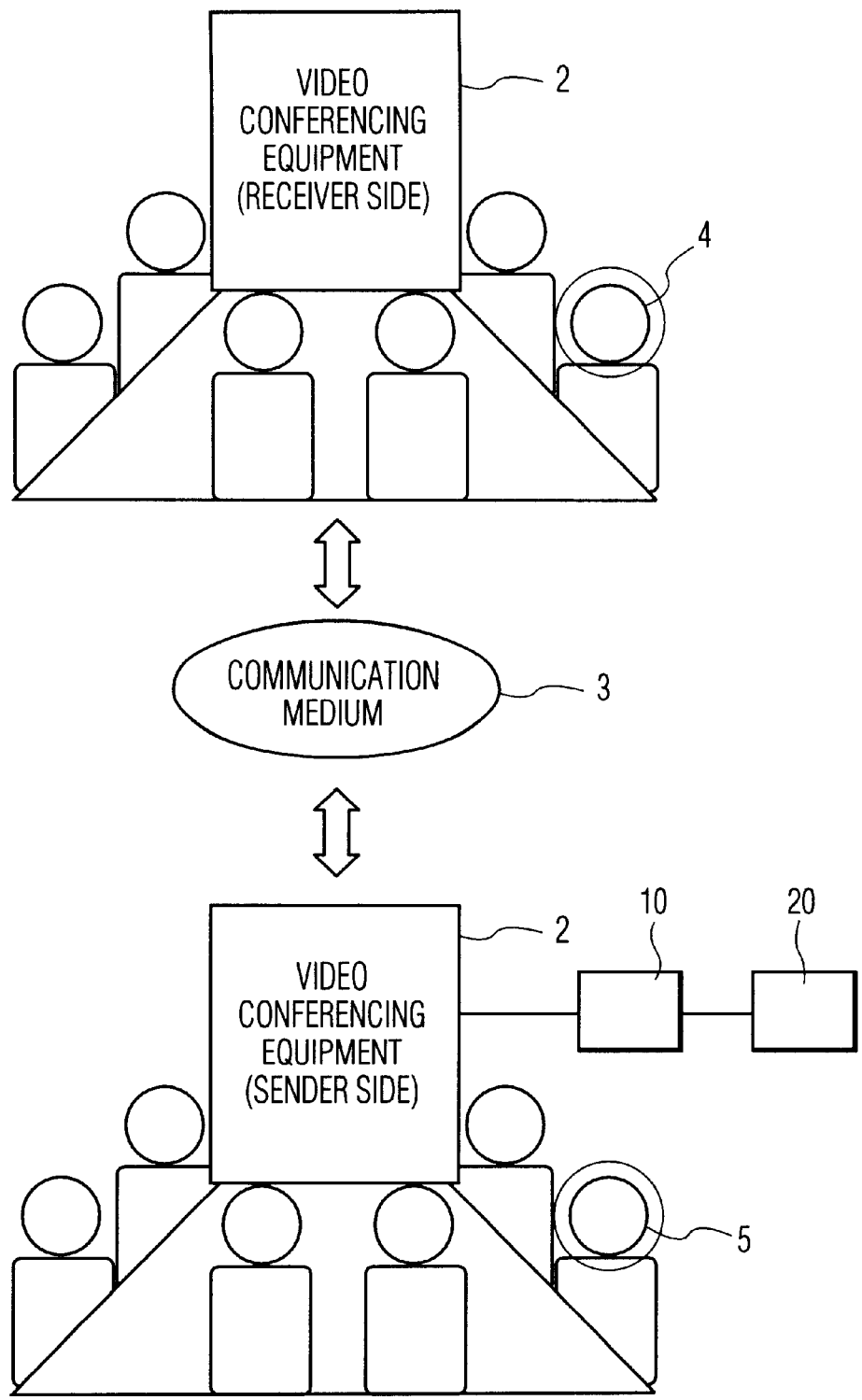
FIG. 1 is a video communication system in accordance with a preferred embodiment of the present invention.
Figure 2:
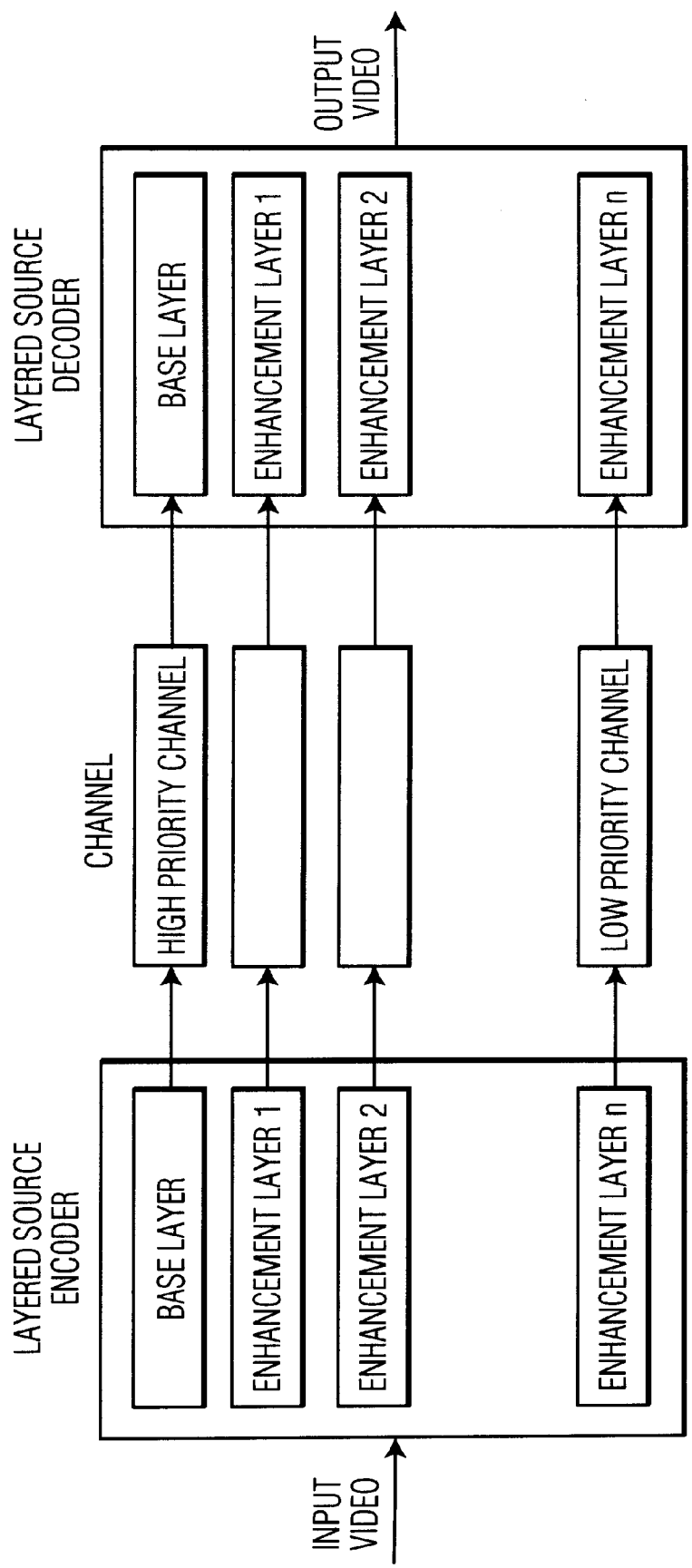
FIG. 2 is a conventional video transmission system using layered coding.

Referring now to FIG. 1, an exemplary video communication system 1, e.g., a video teleconferencing system, is shown. The system 1 includes video equipment, e.g., video conferencing equipment 2 (sender and receiver sides) and a communication medium 3. The system 1 also includes an object acquisition unit 10 and a model database 20. While, the object acquisition unit 10 and the model database 20 as shown as separate elements, it should be understood that these elements may be integrated with the video conferencing equipment 2.

The object acquisition unit 10 identifies various generic objects in the view of the video conferencing equipment 2 that may be modeled. The object acquisition unit 10 then assigns a generic model for each object from the model database 20. For example, individuals face 4 or 5 may be represented using generic face model, as discussed above There may be a plurality of such objects that may be modeled with the view.

Figure 3:
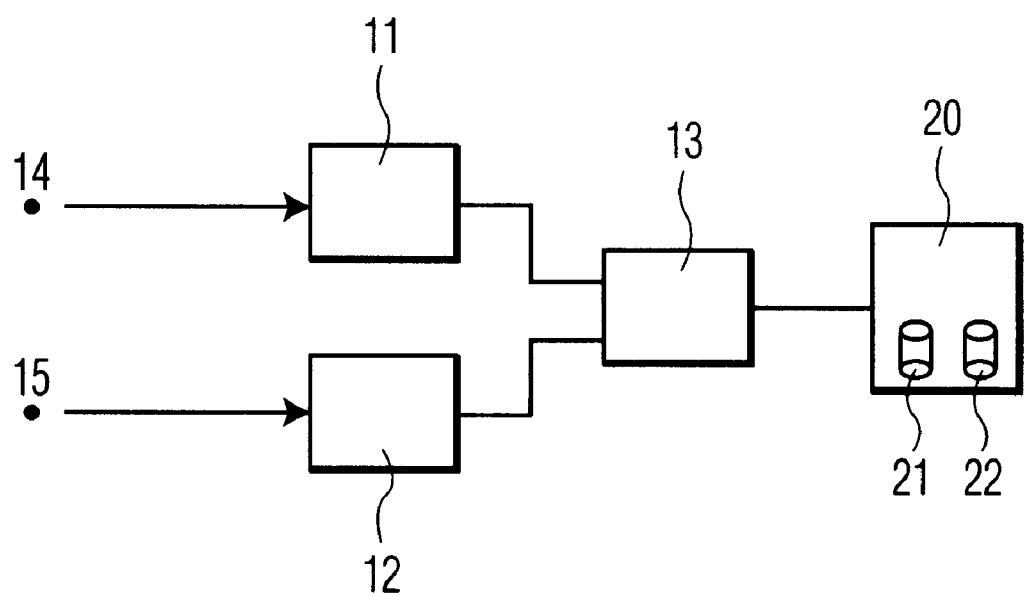
FIG. 3 is a block diagram of an object acquisition and database system in accordance with one aspect of the present invention.

FIG. 3 shows a block diagram of the object acquisition unit 10. The object acquisition unit 10 includes one or more feature extraction determinators 11 and 12, and a feature correspondence matching unit 13. In this arrangement, a left frame 14 and a right frame 15 are input into the acquisition unit 10. The left and right frames are comprised of image data which may be digital or analog. If the image data is analog than an analog-to-digital circuit can be used to convert the data to a digital format.

The feature extraction determinator 11 determines the position/location of various unique features for each identified object in a digital image. For example, the positions of facial features, e.g., nose, eyes, mouth, hair and other details, for the faces 4 and 5 are determined. While two feature extraction determinators 11 and 12 are shown in FIG. 3, one determinator may be used to extract the position information from both the left and right frames 14 and 15. This updated model information may also be provided to the model database 20 for future use. Preferably, the systems and methods described in U.S. patent application Ser. No. 08/385,280, filed on Aug. 30,1999, incorporated by reference herein, comprise the feature extraction determinator 11.

A plurality of generic models 21 and updated models 22 may be stored in the model database 20. The generic models 21 may represent any physical objects and scenes; such as 3D models of automobiles and rooms. The generic models are updated using information from the feature extraction determinator 11 to create the updated models. The updated models 22 are customized or tailored to more accurately represent a specific object such as an individuals face. Additional details of generic model adaptation are described in U.S. patent application Ser. No. 09/422,735, filed on Oct. 21, 1999, incorporated by reference herein.

Figure 4:
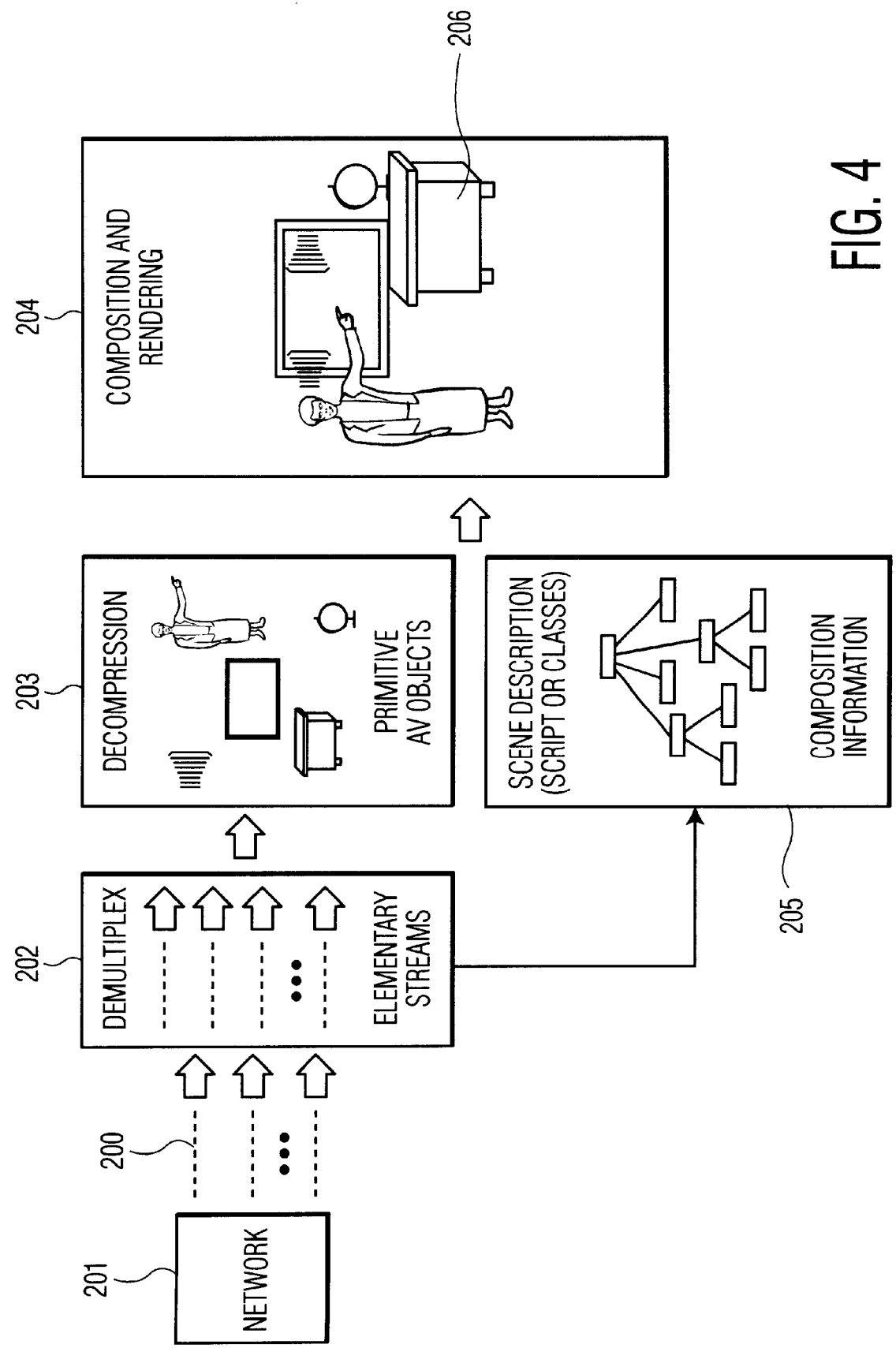
FIG. 4 is a block diagram of an object coder/decoder

FIG. 4 shows a block diagram a coder/decoder in accordance with an embodiment of the invention. Object data streams 200 coming from a network 201 (or a storage device) are received by a demultiplexer 202 and demultiplexed into Elementary Streams (ES). The ESs are parsed and passed to the appropriate decoders 203. The decoding 203 recovers the data in an Audio-Visual (AV) object from its encoded form and performs the necessary operations to reconstruct the original AV object ready for rendering on the appropriate device. The reconstructed AV object is made available to a composition layer 204 for potential use during scene rendering. Decoded AV objects, along with scene description information 205, are used to compose a scene 206. For transmission (encoding), the reverse operation is performed.

In the present invention, AV objects are prioritized and transmitted using a layered coding type approach. Illustratively, in one embodiment, the following steps are performed as described in connection with FIG. 5.

Figure 5:
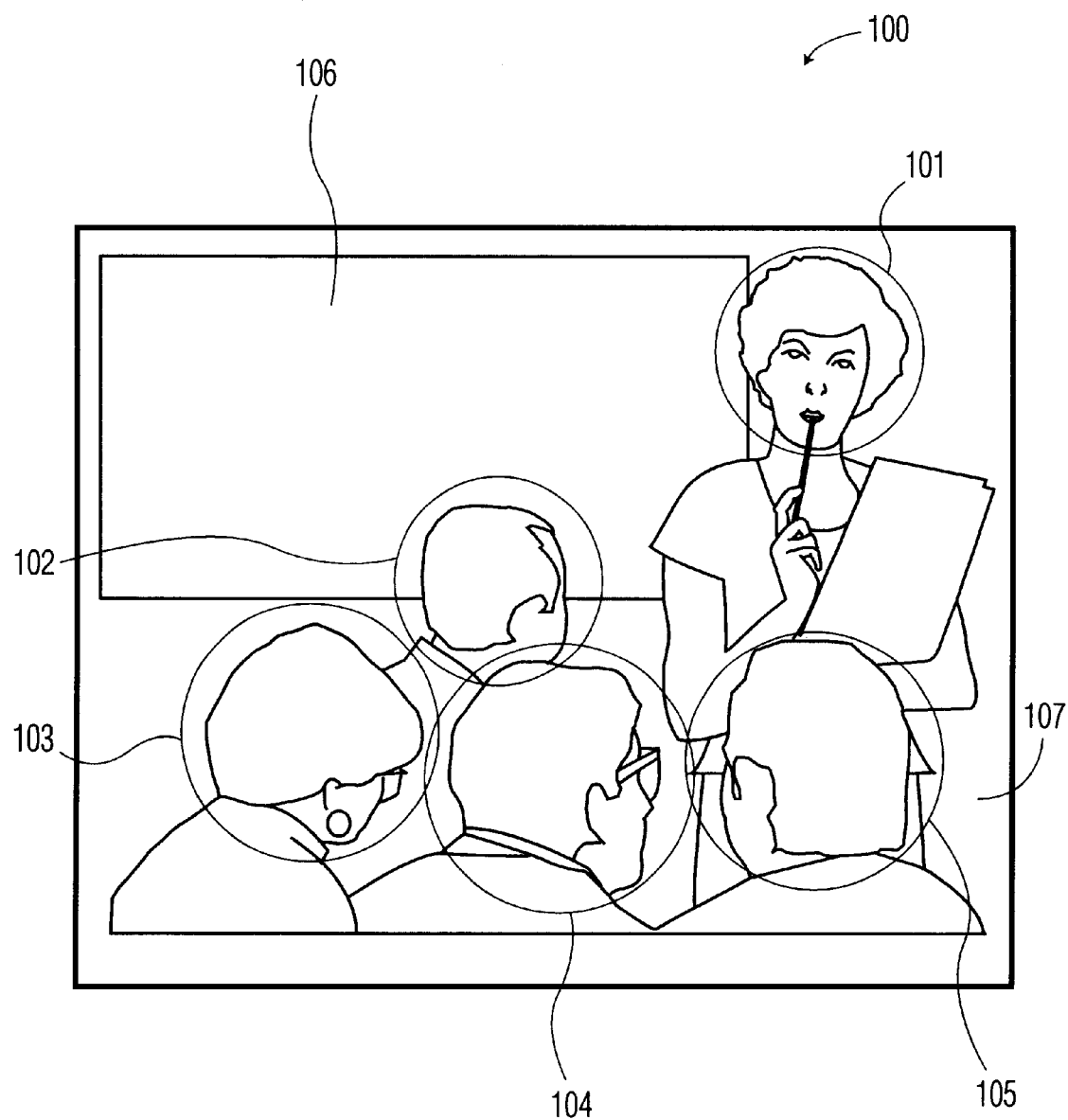
FIG. 5 illustrates a typical view and object identification in accordance with one aspect of the invention.

A view 100 of the video conferencing equipment 2 (sender and receiver sides) is determined. As shown in the embodiment of FIG. 5, a video teleconference is being conducted related to a presentation being given by one person within the view 100. In addition to the presenter, the view includes a blackboard, spectators and general room background.

Specific Objects within the view 100 are identified, e.g., faces 101-105, a presentation board 106 and a rood 107. The identification is performed using conventional image recognition techniques. Generic models are then assigned to each object. The generic models are then updated as discussed above.

The specific objects are prioritized for transmission. The priorities may be determined according to predetermined rules. The exact rules may be selected to fit the particular application, e.g. a presentation, a general meeting, a product demonstration. The setting of the priority levels may be done manually before the video conference or based upon; predetermined criteria such as all faces first, then presentation materials, then spectators, etc. The priority levels may also be dynamically changed during the video communication session, e.g., the presenter may change at some point. The highest priority will typically be assigned to meeting the goals of the application. In this example, the following priorities are assigned to each object:

| Object | Priority |
| --- | --- |
| presenter face 101 | 1 (highest) |
| faces 102–105 | 3 |
| presentation board 106 | 2 |
| room 107 | 4 (lowest) |

The specific objects are then assigned to different channels in order of priority and bandwidth availability within that channel. For example, the objects with a priority of 1 and 2 maybe sent within the base layer-like channel and other lower priority objects maybe sent is various enhancement-like layers.

Data and parameters related to each object are then sent on the assigned channels during the video communication session. The Data and parameters related to each object may also be sent before the video communication session actually begins (i.e., during a set-up period) to update/customize the generic models 21.

This ensures that the most important information is always transmitted first in view of possible transmission errors. For example, if one of the enhancement layer channels fails, the generic/updated model for the object carried on that channel would be maintained based on the previous sent data. In addition the invention allows the overall bandwidth for the transmission to be reduced by using model-based coding.

Figure 6:
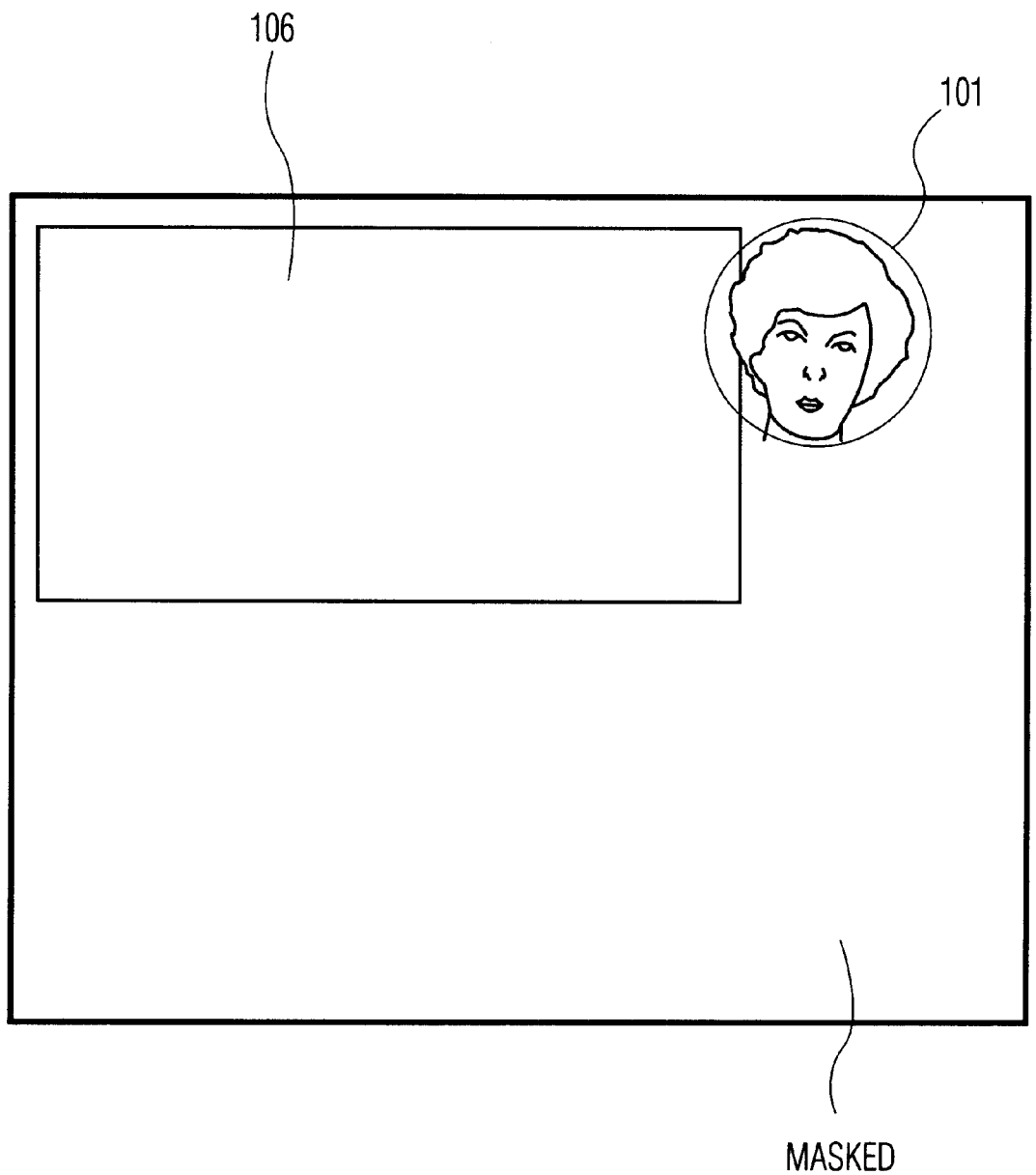
FIG. 6 illustrates a masking embodiment in accordance with another aspect of the invention.

In another embodiment, a masking technique of the view may be used. As shown in FIG. 6, all but the objects with a high priority are first masked. Conventional layered source encoding can be used for resulting image. The remainder (i.e., the masked portion) can then be coded and sent via one of the enhancement layers. Multiple layers of masking may also be used in the embodiment.

Figure 7:
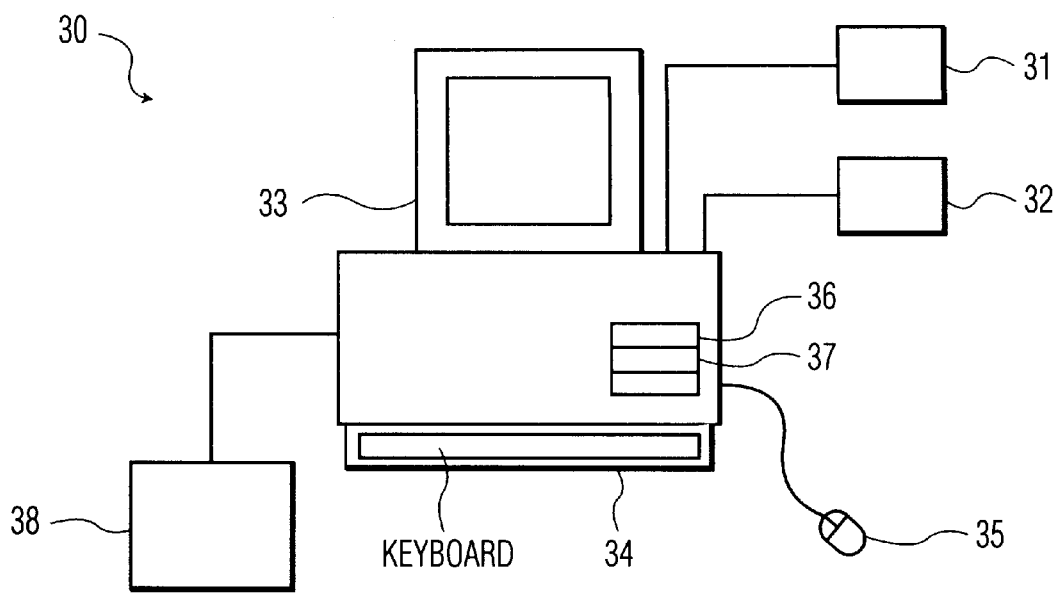
FIG. 7 is a block diagram of an exemplary computer system capable of supporting the system of FIG. 1.

In a preferred embodiment, the coding functions of the system 1 are implemented by computer readable code executed by a data processing apparatus. The code may be stored in a memory within the data processing apparatus or read/downloaded from a memory medium such as a CD-ROM or floppy disk. In other embodiments, hardware circuitry may be used in place of, or in combination with, software instructions to implement the invention. These functions/software/hardware may be formed as part of the video conference equipment 2 or be an adjunct unit. The invention, for example, can also be implemented on a computer 30 shown in FIG. 7.

The computer 30 may include a network connection for interfacing to a data network, such as a variable-bandwidth network or the Internet, and a fax/modem connection 32 for interfacing with other remote sources such as a video or a digital camera (not shown). The computer 30 may also include a display for displaying information is (including video data) to a user, a keyboard for inputting text and user commands, a mouse for positioning a cursor on the display and for inputting user commands, a disk drive for reading from and writing to floppy disks installed therein, and a CD-ROM drive for accessing information stored on CD-ROM. The computer 30 may also have one or more peripheral devices attached thereto, such as a pair of video conference cameras for inputting images, or the like, and a printer for outputting images, text, or the like.

Figure 8:
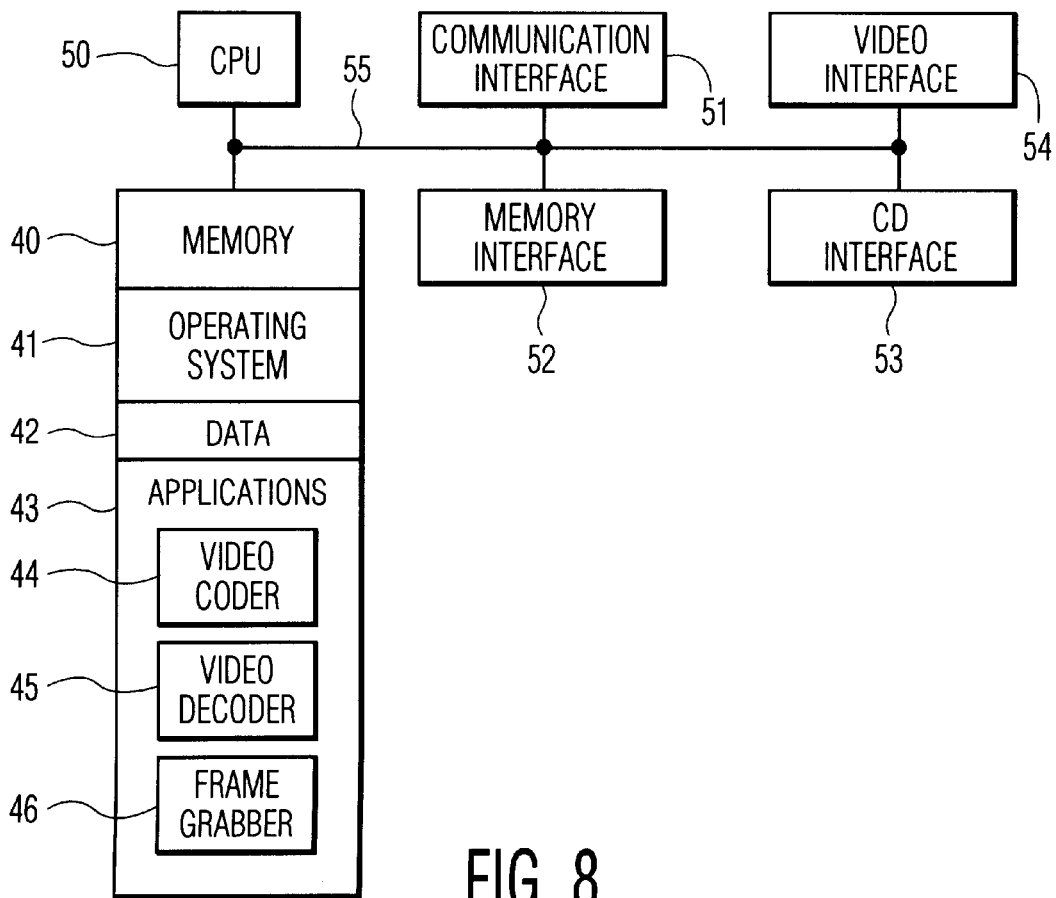
FIG. 8 is a block diagram showing the architecture of the computer system of FIG. 7.

FIG. 8 shows the internal structure of the computer 30 which includes a memory 40 that may include a Random Access Memory (RAM), Read-Only Memory (ROM) and a computer-readable medium such as a hard disk. The items stored in the memory 40 include an operating system 41, data 42 and applications 43. In preferred embodiments of the invention, the operating system 41 is a windowing operating system, such as UNIX; although the invention may be used with other operating systems as well such as Microsoft Windows95. Among the applications stored in memory 40 are a video coder 44, a video decoder 45 and a frame grabber 46. The video coder 44 encodes video data in a conventional manner, and the video decoder 45 decodes video data which has been coded in the conventional manner. The frame grabber 46 allows single frames from a video signal stream to be captured and processed.

Also included in the computer 30 are a central processing unit (CPU) 50, a communication interface 51, a memory interface 52, a CD-ROM drive interface 53, a video interface 54 and a bus 55 The CPU 50 comprises a microprocessor or the like for executing computer readable code, i.e., applications, such those noted above, out of the memory 50. Such applications may be stored in memory 40 (as noted above) or, alternatively, on a floppy disk in-disk drive 36 or a CD-ROM in CD-ROM drive 37. The CPU 50 accesses the applications (or other data) stored on a floppy disk via the memory interface 52 and accesses the applications (or other data) stored on a CD-ROM via CD-ROM drive interface 53.

Input video data may be received through the video interface 54 or the communication interface 51. The input video data may be decoded by the video decoder 45. Output video data may be coded by the video coder 44 for transmission through the video interface 54 or the communication interface 51.

During a video communication session, once the updated model 22 is initially created, information and processing performed by the feature correspondence matching unit 13 and the feature extraction determinator 11 is used to adapt the adjusted model to enable movement, expressions and synchronize audio (i.e., speech). Essentially, the updated model 22 is dynamically transformed to represent the object as needed during the video communication session. The real-time or non-real-time transmission of the model parameters/data provides for low bit-rate animation of a synthetic model. Preferably, the data rate is 64 Kbit/sec or less, however, for moving image a data rate between 64 Kbit/sec to 4 Mbit/sec is also acceptable.

The invention has numerous applications in fields such as video conferencing and animation/simulation of real objects, or in any application in which object modeling is required. For example, typical applications include video games, multimedia creation and improved navigation over the Internet.

While the present invention has been described above in terms of specific embodiments, it is to be understood that the invention is not intended to be confined or limited to the embodiments disclosed herein. For example, the invention is not limited to any specific type of filtering or mathematical transformation or to any particular input image scale or orientation. On the contrary, the present invention is intended to cover various structures and modifications thereof included within the spirit and scope of the appended claims.

What is claimed is:

1. A method for coding data in an image/video communication system comprising the steps of:
   identifying at least two objects with in an image;
   assigning models to represent the at least two objects;
   prioritizing the at least two objects in accordance with predetermined prioritization rules;
   assigning at least two communication channels to communicate data related to the models for the at least two objects so that a higher priority object is assigned to a first communication channel having a first reliability factor and a lower priority object is assigned to a second communication channel having a second reliability factor that is lower than the first reliability factor.

2. The method according to claim 1, further comprising the step of updating the models assigned to the at least two object in order to customized the models related to each of the at least two objects.

3. The method according to claim 2, further comprising the step of storing the updated models in a database.

4. The method according to claim 1, wherein the image/video communication system comprises a video teleconferencing system.

5. The method according to claim 1, wherein the priorities assigned to each of the at least two objects may be dynamically changed during a communication secession.

6. The method according to claim 1, further comprising the step of masking the lower priority object and encoding the higher priority object for transmission.

7. The method according to claim 6, further comprising the step of, after encoding the higher priority object, masking the higher priority object and encoding the lower priority object for transmission.

8. A communication system comprising:
   means for identify at least two objects with in an image;
   means for assigning models to represent the at least two objects;

means for prioritizing the at least two objects in accordance with predetermined prioritization rules;

means for assigning at least two communication channels to communicate data related to the models for the at least two objects so that a higher priority object is assigned to a first communication channel having a first reliability factor higher and a lower priority object is assigned to a second communication channel having a second reliability factor that is lower than the first reliability factor.

9. The system according to claim 8, further comprising means for updating the models assigned to the at least two object in order to customized the models related to each of the at least two objects.

10. The system according to claim 9, further comprising means for storing the updated models in a database.

11. The system according to claim 8, wherein the image/video communication system comprises a video teleconferencing system.

12. The system according to claim 8, means to dynamically change the priorities assigned to each of the at least two objects during a communication secession.

13. The system according to claim 8, further comprising means for masking the lower priority object and means for encoding the higher priority object for transmission.

14. The system according to claim 8, further comprising means for masking the higher priority object and means for encoding the lower priority object for transmission.

15. A memory medium including code for an image/video communication, the code comprising:

code to identify at least two objects with in an image;

code to assign models to represent the at least two objects;

code to prioritize the at least two objects in accordance with predetermined prioritization rules;

code to assign at least two communication channels to communicate data related to the models for the at least two objects so that a higher priority object is assigned to a first communication channel having a first reliability factor and a lower priority object is assigned to a second communication channel having a second reliability factor that is lower than the first reliability factor.

16. The memory medium according to claim 15, further comprising code to update the models assigned to the at least two object in order to customized the models related to each of the at least two objects.

17. The memory medium according to claim 15, wherein the image/video communication system comprises a video teleconferencing system.

18. The memory medium according to claim 15, further comprising code to dynamically change the priorities assigned to each of the at least two objects during a communication secession.

19. The memory medium according to claim 15, further comprising code to mask the lower priority object and encode the higher priority object for transmission.

20. The memory medium according to claim 15, further comprising code to mask the higher priority object and encode the lower priority object for transmission.

* * * * *